(12) United States Patent
Saito et al.

(10) Patent No.: US 10,018,811 B2
(45) Date of Patent: Jul. 10, 2018

(54) IMAGING LENS AND IMAGING APPARATUS

(71) Applicant: FUJIFILM Corporation, Tokyo (JP)

(72) Inventors: Hiroki Saito, Saitama (JP); Takashi Suzuki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 14 days.

(21) Appl. No.: 15/061,437

(22) Filed: Mar. 4, 2016

(65) Prior Publication Data

US 2016/0282590 A1 Sep. 29, 2016

(30) Foreign Application Priority Data

Mar. 24, 2015 (JP) .................................. 2015-060676

(51) Int. Cl.
*G02B 15/14* (2006.01)
*G02B 7/02* (2006.01)
*G02B 13/04* (2006.01)

(52) U.S. Cl.
CPC .................................... *G02B 13/04* (2013.01)

(58) Field of Classification Search
CPC .. G02B 13/009; G02B 13/0035; G02B 15/20; G02B 15/167; G02B 27/646
USPC .................................. 359/676–706, 811–830
See application file for complete search history.

(56) References Cited

U.S. PATENT DOCUMENTS

| 4,087,160 A | * | 5/1978 | Besenmatter | .......... G02B 15/17 359/683 |
| 8,416,512 B2 | * | 4/2013 | Harada | ................ G02B 15/161 359/794 |
| 2009/0015938 A1 | * | 1/2009 | Harada | .................. G02B 13/06 359/676 |
| 2012/0314291 A1 | * | 12/2012 | Kogo | .................. G02B 15/173 359/557 |

FOREIGN PATENT DOCUMENTS

| JP | 2000-147373 A | 5/2000 |
| JP | 2006-201526 A | 8/2006 |
| JP | 2009-020341 A | 1/2009 |
| JP | 2009-198855 A | 9/2009 |
| JP | 2010-008577 A | 1/2010 |
| JP | 2013-007856 A | 1/2013 |

(Continued)

OTHER PUBLICATIONS

An Office Action; "Notification of Reasons for Refusal," mailed by the Japanese Patent Office dated Jan. 23, 2018, which corresponds to Japanese Patent Application No. 2015-060676 and is related to U.S. Appl. No. 15/061,437; with English Translation.

*Primary Examiner* — Mahidere Sahle

(74) *Attorney, Agent, or Firm* — Studebaker & Brackett PC

(57) ABSTRACT

An imaging lens includes, consecutively in order from the most object-side, a positive first lens group, a positive second lens group and a third lens group. Focusing on an object at close distance from a state of having focused on an object at infinity is performed by moving the second lens group and the third lens group in such a manner that a (Continued)

distance between the second lens group and the third lens group changes while the first lens group is fixed. The first lens group includes, consecutively in order from the most object-side, a negative first lens and a negative second lens.

13 Claims, 9 Drawing Sheets

(56) References Cited

FOREIGN PATENT DOCUMENTS

| | | |
|---|---|---|
| JP | 2014-048488 A | 3/2014 |
| JP | 2016-038418 A | 3/2016 |
| JP | 2016-099436 A | 5/2016 |

\* cited by examiner

EXAMPLE 1

INFINITY

CLOSE

EXAMPLE 2

EXAMPLE 3

INFINITY

CLOSE

EXAMPLE 4

INFINITY

CLOSE

EXAMPLE 1

EXAMPLE 4

IMAGING LENS AND IMAGING APPARATUS

CROSS-REFERENCE TO RELATED APPLICATION

The present application claims priority under 35 U.S.C. § 119 to Japanese Patent Application No. 2015-060676, filed on Mar. 24, 2015. The above application is hereby expressly incorporated by reference, in its entirety, into the present application.

BACKGROUND

The present disclosure relates to an imaging lens and an imaging apparatus, and particularly to an imaging lens appropriate for a digital camera, a video camera and the like, and an imaging apparatus including such an imaging lens.

Conventionally, a floating focus type lens system, in which focusing is performed by moving at least two lens groups on paths different from each other, was proposed as an imaging lens used in an imaging apparatus, such as a digital camera. For example, Japanese Unexamined Patent Publication No. 2000-147373 (Patent Document 1) and Japanese Unexamined Patent Publication No. 2009-020341 (Patent Document 2) disclose optical systems, in which a first lens group fixed during focusing is arranged closest to the object side, and two lens groups present toward the image side of this first lens group are used as focusing groups, which move during focusing. These two lens groups are moved during focusing in such a manner that a distance between them changes.

SUMMARY

An imaging apparatus in the aforementioned fields needs to have compact configuration, a wide angle of view, and a small F-number. Further, in recent years, the imaging apparatus needs to be able to perform photography at closer distance. Meanwhile, in an imaging lens having a wide angle of view and a small F-number, aberrations tend to occur if the imaging lens is tried to be focused on an object at closer distance without changing the total length of the lens system. The floating focus type lens system is advantageous to focusing while suppressing aberrations.

However, in the floating focus type optical systems disclosed in aforementioned Patent Documents 1 and 2, the first lens group has negative refractive power, and the focusing groups situated to follow this first lens group have large diameters. Therefore, the diameter of a lens barrel also tends to become large. Further, since the weight of the focusing groups that have large diameters is heavy, a load on a drive system becomes large, and there is a problem that it becomes difficult to make the focusing speed high.

In view of the foregoing circumstances, the present disclosure provides, while suppressing an increase in the diameter of focusing groups, an imaging lens that has a wide angle of view and a small F-number, and is able to focus on an object at close distance without increasing the size of the lens system, and is able to maintain excellent performance, and an imaging apparatus including this imaging lens.

An imaging lens of the present disclosure includes, consecutively in order from the most object-side, a first lens group having positive refractive power, a second lens group having positive refractive power and a third lens group. Focusing on an object at close distance from a state of having focused on an object at infinity is performed by moving the second lens group and the third lens group in such a manner that a distance in the direction of an optical axis between the second lens group and the third lens group changes while the first lens group is fixed. The first lens group includes, consecutively in order from the most object-side, a first lens having negative refractive power and a second lens having negative refractive power.

In the imaging lens of the present disclosure, it is desirable that the following conditional expression (1) is satisfied. It is more desirable that the following conditional expression (1-1) is satisfied. It is even more desirable that the following conditional expression (1-2) is satisfied:

$$-1.5 < f1ab/f1 < -0.1 \quad (1);$$

$$-1.0 < f1ab/f1 < -0.2 \quad (1\text{-}1); \text{ and}$$

$$-0.7 < f1ab/f1 < -0.3 \quad (1\text{-}2), \text{ where}$$

f1ab: a combined focal length of the first lens and the second lens, and f1: a focal length of the first lens group.

It is desirable that the third lens group consists of only one single lens. Here, the term "single lens" means a lens consisting of a lens that is not a cemented lens.

In the imaging lens of the present disclosure, it is desirable that the following conditional expression (2) is satisfied. It is more desirable that the following conditional expression (2-1) is satisfied:

$$0.1 < f2/|f3| < 0.7 \quad (2); \text{ and}$$

$$0.1 < f2/|f3| < 0.5 \quad (2\text{-}1), \text{ where}$$

f2: a focal length of the second lens group, and f3: a focal length of the third lens group.

It is desirable that the second lens group includes a positive lens closest to the object side. When the second lens group includes the positive lens closest to the object side, it is desirable that the following conditional expression (3) is satisfied. It is more desirable that the following conditional expression (3-1) is satisfied:

$$0.3 < f2/f2a < 2 \quad (3); \text{ and}$$

$$0.6 < f2/f2a < 1.7 \quad (3\text{-}1), \text{ where}$$

f2: a focal length of the second lens group, and f2a: a focal length of the positive lens closest to the object side in the second lens group.

When the second lens group includes the positive lens closest to the object side, it is desirable that the second lens group includes a stop between an image-side surface of the positive lens closest to the object side in the second lens group and a surface closest to the image side in the second lens group. Further, in that case, the second lens group may be configured to include, toward the image side of the stop in order from the object side, only four lenses of a negative lens, a positive lens, a negative lens and a positive lens.

It is desirable that the first lens group includes two positive lenses. It is desirable that the first lens group includes, toward the image side of the second lens consecutively after the second lens, a third lens having negative refractive power.

The imaging lens of the present disclosure may consist of the first lens group, the second lens group and the third lens group. Alternatively, the imaging lens of the present disclosure may consist of the first lens group, the second lens group, the third lens group and a fourth lens group that is arranged toward the image side of the third lens group and fixed during focusing.

The imaging apparatus of the present disclosure includes the imaging lens of the present disclosure.

Here, the expression "consist of" means "consist essentially of", and a lens having substantially no refractive power, an optical element, such as a stop, a cover glass and a filter, other than the lenses, a mechanism part, such as a lens flange, a lens barrel and a hand shake blur correction mechanism, and the like may be included besides the mentioned composition elements.

Here, the term "consecutively" in the expression "includes, consecutively . . . and a third lens group", the expression "includes, consecutively . . . and a second lens" and the expression "consecutively . . . a third lens having negative refractive power" is used about lens groups and lenses, and the other members are excluded from consideration.

A "lens group" does not necessarily consist of plural lenses, but a lens group consisting of only one lens may be included. Further, the sign of the refractive power of each of the aforementioned lens groups represents the sign of the refractive power of a corresponding group as a whole. Further, when an aspheric surface is included, the aforementioned sign of refractive power is considered in a paraxial region.

According to the present disclosure, in a floating focus type lens system consisting of at least three lens groups, a positive first lens group that is fixed during focusing is arranged closest to the object side, and focusing groups are arranged consecutively toward the image side of the first lens group, and the configuration of the first lens group is appropriately set. Therefore, it is possible to provide, while suppressing an increase in the diameter of focusing groups, an imaging lens that has a wide angle of view and a small F-number, and is able to focus on an object at close distance without increasing the size of the lens system, and is able to maintain excellent performance, and an imaging apparatus including this imaging lens.

DESCRIPTION OF THE PREFERRED EMBODIMENTS

Hereinafter, embodiments of the present disclosure will be described in detail with reference to drawings. FIG. 1 through FIG. 4 are sectional views illustrating the configuration of imaging lenses in embodiments of the present disclosure and optical paths, and which correspond to Examples 1 through 4, respectively, which will be described later. The basic configuration and an illustration method of the examples illustrated in FIG. 1 through FIG. 4 are similar. Therefore, the following explanation will be made mainly with reference to the example illustrated in FIG. 1.

Figure 1:
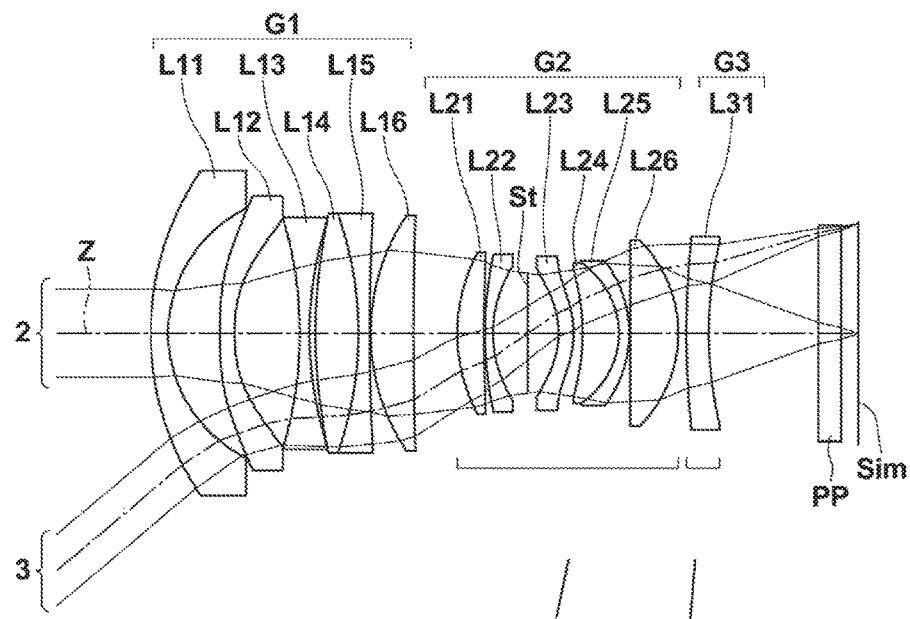
FIG. 1 is a sectional view illustrating the configuration of an imaging lens in Example 1 of the present disclosure and optical paths.
Figure 1:
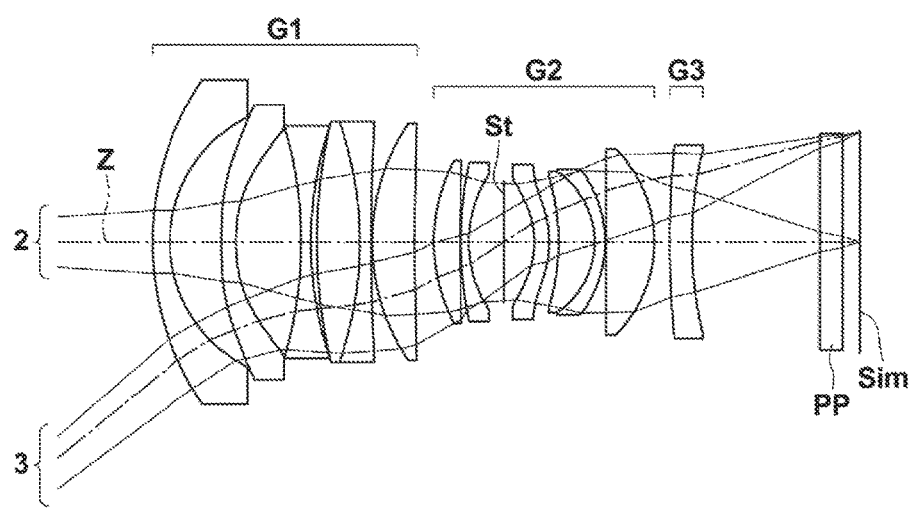

In FIG. 1, the left side is the object side, and the right side is the image side. In FIG. 1, the upper section, to which the term "INFINITY" is given, illustrates a state of having focused on an object at infinity, and the lower section, to which the term "CLOSE" is given, illustrates a state of having focused on an object at close distance. In FIG. 1, optical paths for axial rays 2 and off-axial rays 3 at a maximum angle of view are illustrated.

This imaging lens includes, consecutively along optical axis Z in order from the object side, first lens group G1 having positive refractive power, second lens group G2 having positive refractive power, and third lens group G3. In the example of FIG. 1, first lens group G1 consists of, arranged in order from the object side, first lens L11, second lens L12, third lens L13 and lenses L14 through L16. Second lens group G2 consists of, arranged in order from the object side, lenses L21, L22, aperture stop St and lenses L23 through L26. Third lens group G3 consists of only lens L31. Here, aperture stop St illustrated in FIG. 1 does not necessarily represent the size nor the shape of the aperture stop, but the position of the aperture stop on optical axis Z.

When this imaging lens is applied to an imaging apparatus, various filters, such as an infrared-ray cut filter and a low-pass filter, a cover glass and the like may be arranged between the lens system and image plane Sim based on the configuration of the imaging apparatus. Therefore, FIG. 1 illustrates an example in which parallel-flat-plate-shaped optical member PP, which is assumed to be these elements, is arranged between the lens system and image plane Sim. However, the position of optical member PP is not limited to the position illustrated in FIG. 1, and configuration in which optical member PP is omitted is adoptable.

In this imaging lens, focusing on an object at close distance from a state of having focused on an object at infinity is performed by moving second lens group G2 and third lens group G3 in such a manner that a distance in the direction of an optical axis between second lens group G2 and third lens group G3 changes while first lens group G1 is fixed with respect to image plane Sim. In FIG. 1, an arrow schematically indicating the direction of movement of each lens group that moves during focusing on the object at close distance from a state of having focused on an object at infinity is written between the upper section and the lower section.

Since first lens group G1 is a lens group having positive refractive power, it is possible to make rays entering second lens group G2 from first lens group G1 condensed light. Therefore, it is possible to prevent the diameters of second lens group G2 and a lens or lenses situated toward the image side of second lens group G2 from becoming large. In other words, it is possible to prevent the diameter of second lens group G2 and third lens group G3, which are focusing groups, from becoming large. Further, since floating focus type configuration, in which focusing is performed by moving second lens group G2 and third lens group G3 on different paths from each other, is adopted, focusing on an object at close distance is possible while suppressing generation of aberrations in a lens system having a wide angle of view and a small F-number.

First lens group G1 includes, consecutively in order from the most object-side, first lens L11 having negative refractive power and second lens L12 having negative refractive power. Accordingly, it is possible to achieve a wide angle of view while preventing the diameter of first lens group G1 from becoming large.

This imaging lens is configured to satisfy the following conditional expression (1) about first lens L11 and second lens L12:

$$-1.5<f1ab/f1<-0.1 \quad (1),\text{ where}$$

f1ab: a combined focal length of the first lens and the second lens, and f1: a focal length of the first lens group.

When the lower limit of conditional expression (1) is satisfied, it is possible to secure the refractive power of first lens L11 and second lens L12, and to easily prevent the diameter of first lens group G1 from becoming large. When the upper limit of conditional expression (1) is satisfied, it is possible to secure the refractive power of first lens group G1, and to easily prevent the diameters of second lens group G2 and a lens group or groups after second lens group G2 from becoming large. It is more desirable that the following conditional expression (1-1) is satisfied to further improve the effect about conditional expression (1). It is even more desirable that the following conditional expression (1-2) is satisfied:

$$-1.0<f1ab/f1<-0.2 \quad (1\text{-}1);\text{ and}$$

$$-0.7<f1ab/f1<-0.3 \quad (1\text{-}2).$$

It is desirable that first lens group G1 includes, toward the image side of second lens L12 consecutively after second lens L12, third lens L13 having negative refractive power. In such a case, it is possible to easily achieve a large angle of view while preventing the diameter of first lens group G1 from becoming large.

Further, it is desirable that first lens group G1 includes two positive lenses. In such a case, it is possible to easily secure the positive refractive power of first lens group G1 without worsening a spherical aberration.

For example, as in the example of FIG. 1, first lens group G1 may consist of, in order from the object side, a negative meniscus lens with its convex surface facing the object side, a negative meniscus lens with its convex surface facing the object side, a biconcave lens, a biconvex lens, a negative lens and a positive lens. When first lens group G1 consists of four negative lenses and two positive lenses and the arrangement of refractive power is negative, negative, negative, positive, negative and positive in this manner, that is advantageous to both widening an angle of view and securing positive refractive power.

Further, it is desirable that the following conditional expression (2) about the focusing groups is satisfied:

$$0.1<|f2/f3|<0.7 \quad (2),\text{ where}$$

f2: a focal length of the second lens group, and f3: a focal length of the third lens group.

When the lower limit of conditional expression (2) is satisfied, it is possible to make the effect of correcting aberrations by third lens group G3 certain, and to suppress generation of aberrations when the imaging lens is focused on an object at close distance. When the upper limit of conditional expression (2) is satisfied, it is possible to prevent the effect of correcting aberrations by third lens group G3 from becoming excessive. Accordingly, it is possible to increase the allowable amount of error in relative positions of second lens group G2 and third lens group G3, and to suppress deterioration of performance caused by production error. That is advantageous to achievement of excellent performance. It is more desirable that the following conditional expression (2-1) is satisfied to further improve the effect about the upper limit of conditional expression (2) while achieving the effect about the lower limit of conditional expression (2):

$$0.1<|f2/f3|<0.5 \quad (2\text{-}1).$$

Further, as in the example of FIG. 1, it is desirable that second lens group G2 of this imaging lens includes a positive lens closest to the object side. In such a case, it is possible to prevent the diameter of second lens group G2 from becoming large.

When second lens group G2 includes a positive lens closest to the object side, it is desirable that the following conditional expression (3) is satisfied:

$$0.3<f2/f2a<2 \quad (3),\text{ where}$$

f2: a focal length of the second lens group, and f2a: a focal length of the positive lens closest to the object side in the second lens group.

When the lower limit of conditional expression (3) is satisfied, it is possible to prevent the refractive power of a positive lens closest to the object side in second lens group G2 from becoming insufficient, and to easily prevent the diameter of second lens group G2 from becoming large. When the upper limit of conditional expression (3) is satisfied, it is possible to prevent the refractive power of the positive lens closest to the object side in second lens group G2 from becoming excessive, and to easily suppress generation of a spherical aberration. It is more desirable that the following conditional expression (3-1) is satisfied to further improve the effect about conditional expression (3):

$$0.6<f2/f2a<1.7 \quad (3\text{-}1).$$

When second lens group G2 includes a positive lens closest to the object side, it is desirable that second lens group G2 includes aperture stop St between an image-side surface of this positive lens and a surface closest to the image side in second lens group G2. In such a case, it is possible to condense rays at the positive lens closest to the object side in second lens group G2, and to prevent the diameter of aperture stop St from becoming large.

When second lens group G2 includes a positive lens closest to the object side, and includes aperture stop St in the aforementioned range, it is desirable that second lens group G2 includes, toward the image side of aperture stop St in order from the object side, only four lenses of a negative lens, a positive lens, a negative lens and a positive lens. The most object-side lens of these four lenses is advantageous to excellent correction of a spherical aberration. The second and third lenses of these four lenses are advantageous to excellent correction of a lateral chromatic aberration. The most image-side lens of these four lenses is advantageous to making the position of an exit pupil closer to the object side.

Further, when second lens group G2 includes, toward the image side of aperture stop St, only the aforementioned four lenses, second lens group G2 may include, toward the object side of aperture stop St in order from the object side, only two lenses of a positive lens and a negative lens as in the example of FIG. 1. Such a case is more advantageous to excellent correction of a lateral chromatic aberration.

As in the example of FIG. 1, it is desirable that third lens group G3 consists essentially of only one single lens. In such a case, it is possible to easily suppress the refractive power of third lens group G3, and to increase the allowable amount of error in relative positions of second lens group G2 and third lens group G3, and to suppress deterioration of performance caused by production error. That is advantageous to achievement of excellent performance. Here, third lens group G3 may be a lens group having negative refractive power as in the examples of FIG. 1, FIG. 3 and FIG. 4. Alternatively, third lens group G3 may be a lens group having positive refractive power as in the example of FIG. 2.

As in the example of FIG. 1, the imaging lens may consist essentially of three lens groups of first lens group G1, second lens group G2 and third lens group G3. In such a case, it is possible to suppress the number of lenses, and to secure space in which the focusing groups move while maintaining the total length of the lens system. That is advantageous to reduction in size and reduction in cost. Further, it is possible to simplify the structure of the apparatus.

Figure 3:
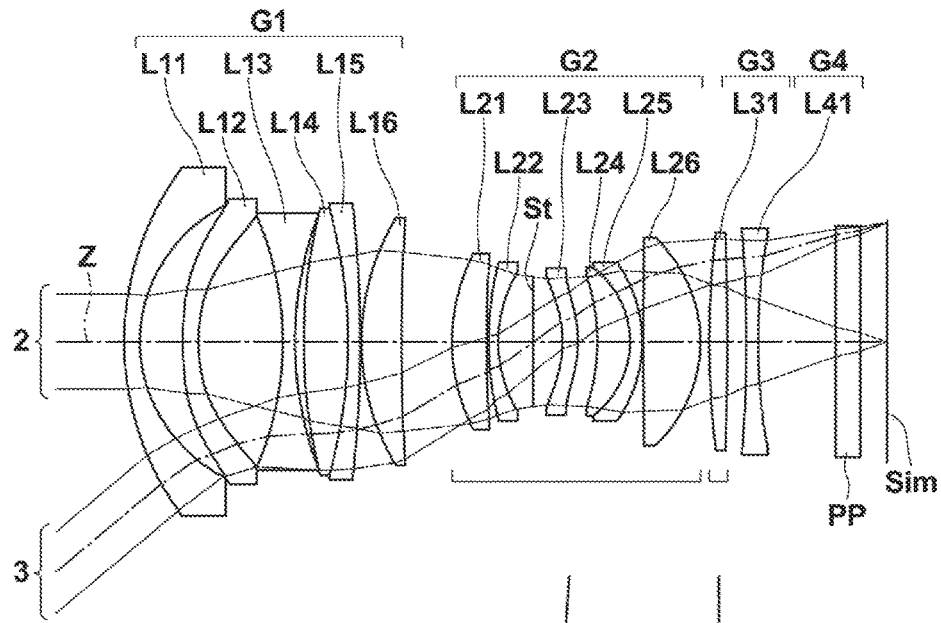
FIG. 3 is a sectional view illustrating the configuration of an imaging lens in Example 3 of the present disclosure and optical paths.
Figure 3:
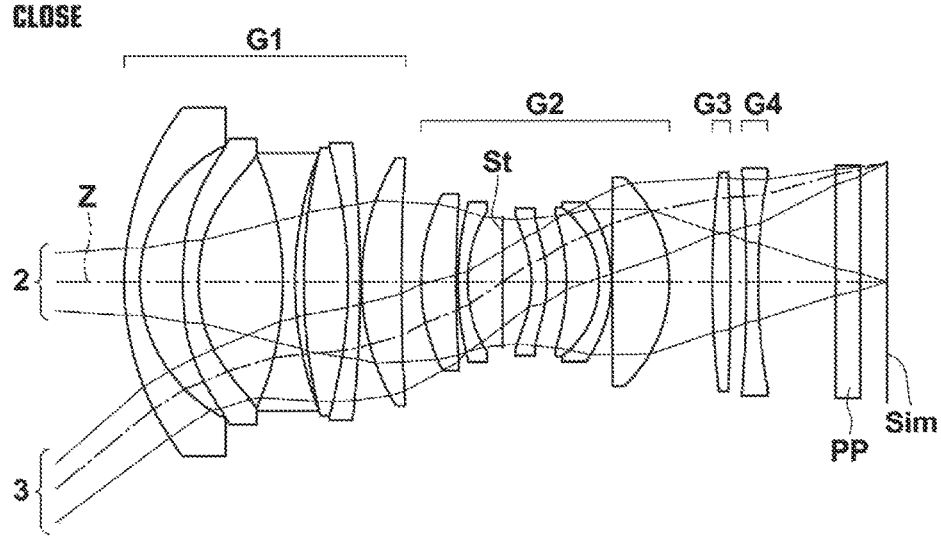

Alternatively, as in the example of FIG. 3, the imaging lens may consist essentially of four lens groups of first lens group G1, second lens group G2, third lens group G3 and fourth lens group G4, which is fixed with respect to image plane Sim during focusing. Since influence on performance by a fixed lens group is small, compared with moving lens groups, when such a fixed lens group is arranged in the vicinity of image plane Sim, it is possible to suppress a fluctuation of aberrations during focusing while suppressing deterioration of performance caused by production error. Further, when the lens group that is fixed during focusing is arranged closest to the image side, that is advantageous to protection against dust.

An arbitrary combination of the desirable configuration and possible configuration as described above is possible. It is desirable that they are optionally adopted in an appropriate manner based on required specification. When the aforementioned configuration is appropriately adopted, it is possible to achieve a wide angle of view, a small F-number, compact structure and excellent performance. Here, the term "wide angle of view" means a full angle of view of 80° or greater, and the term "small F-number" means an F-number of 1.5 or less in a state of having focused on an object at infinity.

Next, numerical value examples of the imaging lenses of the present disclosure will be described.

Example 1

FIG. 1 is a diagram illustrating the configuration of an imaging lens in Example 1. Since each lens group and each lens in the configuration of FIG. 1 have been described in detail already, the explanation is not repeated here. The following Table 1 through Table 3 show numerical value data representing, in detail, the configuration of the imaging lens in Example 1. Table 1 shows basic lens data, and Table 2 shows aspheric coefficients, and Table 3 shows specification and values of variable surface distances.

In Table 1, the column of Si shows the surface numbers of i-th (i=1, 2, 3, . . . ) surfaces when surface numbers are assigned to surfaces of composition elements in such a manner to sequentially increase toward the image side from the object-side surface of a composition element closest to the object side, as the first surface. The column of Ri shows the curvature radius of the i-th surface. The column of Di shows a surface distance, on optical axis Z, between the i-th surface and the (i+1)th surface. The column of Ndj shows the refractive index of a j-th (j=1, 2, 3, . . . ) composition element for d-line (wavelength is 587.6 nm) when a composition element closest to the object side is the first composition element and the value of j sequentially increases toward the image side. The column of vdj shows the Abbe number of the j-th composition element for d-line.

Here, the sign of a curvature radius is positive when the shape of a surface is convex toward the object side, and negative when the shape of a surface is convex toward the image side. Table 1 shows also aperture stop St and optical member PP. In Table 1, a surface number and the term "(St)" are written in the row of a surface number corresponding to aperture stop St. A value at the bottom of the column of Di is a distance between optical member PP and image plane Sim.

In table 1, the mark of * is attached to the surface number of an aspheric surface, and the column of curvature radius shows the numerical value of a paraxial curvature radius for an aspheric surface. Table 2 shows aspheric coefficients for each aspheric surface of Example 1. In the numerical values of aspheric coefficients in Table 2, "E-n" (n: integer) means "×10$^{-n}$". The aspheric coefficients are the values of coefficients KA, Am (m=3, 4, 5, . . . 20) in an aspheric equation represented by the following expression:

$$Zd = \frac{C \times h^2}{1 + \sqrt{1 - KA \times C^2 \times h^2}} + \sum_m Am \times h^m, \quad \text{[NUMERICAL EXPRESSION 1]}$$

where

Zd: the depth of an aspheric surface (the length of a perpendicular from a point on an aspheric surface at height h to a flat plane that is in contact with the vertex of the aspheric surface and perpendicular to an optical axis), h: height (a distance from the optical axis to a lens surface), C: a paraxial curvature, and KA, Am (m=3, 4, 5, . . . 20): aspheric coefficients.

In Table 1, the mark of "DM [ ]" is used for a variable surface distance that changes during focusing, and the surface number of an object-side surface of this distance is written in [ ]. Table 3 shows the values of these variable surface distances and the values for d-line of focal length f of an entire system, lateral magnification β, F-number FNo. and maximum full angle of view 2ω. In the row of 2ω, [°] means that the unit is degrees. In Table 3, values in a state of having focused on an object at infinity, a state of having focused on an object at middle distance, and a state of having focused on an object at close distance are shown in the columns indicated by "INFINITY", "MIDDLE" and "CLOSE", respectively.

In the data of each table, degrees are used as the unit of angle, and mm is used as the unit of length. However, since an optical system is usable by proportionally enlarging or by proportionally reducing, other appropriate units may be used. Further, in each of the following tables, numerical values rounded at predetermined places are written.

TABLE 1

EXAMPLE 1

| Si | Ri | Di | Ndj | vdj |
|---|---|---|---|---|
| 1 | 38.3268 | 2.2000 | 1.84666 | 23.78 |
| 2 | 18.2985 | 6.4628 | | |
| *3 | 101.4033 | 1.8000 | 1.58313 | 59.37 |
| *4 | 24.8055 | 8.1652 | | |
| 5 | −54.0691 | 1.2000 | 1.48749 | 70.24 |
| 6 | 48.5554 | 0.7482 | | |
| 7 | 70.2046 | 5.4400 | 2.00100 | 29.13 |
| 8 | −47.6350 | 1.3800 | 1.51742 | 52.43 |
| 9 | 269.0688 | 0.1436 | | |
| 10 | 28.1259 | 5.3500 | 1.88300 | 40.76 |
| 11 | 424.0469 | DD[11] | | |
| 12 | 23.0504 | 3.3200 | 1.81600 | 46.62 |
| 13 | 273.0245 | 0.1300 | | |
| 14 | 49.5397 | 1.0000 | 1.92286 | 18.90 |
| 15 | 16.3940 | 4.3829 | | |
| 16(St) | ∞ | 3.8277 | | |
| *17 | −11.7384 | 1.8700 | 1.80348 | 40.45 |
| *18 | −13.2023 | 1.1383 | | |
| 19 | −29.6767 | 4.5200 | 1.59282 | 68.62 |
| 20 | −11.1270 | 1.3000 | 1.64769 | 33.79 |
| 21 | −15.9271 | 0.1300 | | |
| 22 | ∞ | 6.0100 | 1.49700 | 81.61 |
| 23 | −17.3654 | DD[23] | | |
| 24 | 125.9601 | 2.8000 | 1.94595 | 17.98 |
| 25 | 52.8849 | DD[25] | | |
| 26 | ∞ | 2.8500 | 1.51680 | 64.20 |
| 27 | ∞ | 2.1206 | | |

TABLE 2

EXAMPLE 1

| SURFACE NUMBER | 3 | 4 | 17 | 18 |
|---|---|---|---|---|
| KA | 3.0752596E+00 | 9.9576104E−01 | 4.8561823E−01 | 7.8153884E−01 |
| A3 | −2.6531748E−04 | −3.4957907E−04 | −1.3557524E−05 | 7.0877725E−05 |
| A4 | 1.1298117E−04 | 1.1431746E−04 | 4.0045257E−06 | 4.3287259E−05 |
| A5 | 4.1026774E−05 | 5.6230975E−05 | −2.7170685E−05 | 2.1066997E−05 |
| A6 | −9.4555654E−06 | −1.3625626E−05 | 8.9246958E−06 | −5.3988528E−06 |
| A7 | 6.1495285E−07 | 1.0481089E−06 | −4.6664264E−07 | 6.4638873E−07 |
| A8 | −9.2607734E−10 | −1.4116031E−08 | −1.4315616E−07 | 1.3600375E−07 |
| A9 | −3.2078817E−10 | −8.7386914E−10 | 9.7408852E−09 | −7.8107596E−09 |
| A10 | −1.0029111E−10 | −1.1803106E−10 | 7.5130458E−09 | −5.0942183E−09 |
| A11 | 1.0774764E−12 | 5.4917878E−12 | −2.0995964E−10 | 6.9123977E−11 |
| A12 | 3.3183604E−13 | 4.5666130E−13 | −3.4306612E−10 | 1.9329420E−10 |
| A13 | 1.9993012E−14 | 1.2608406E−14 | 4.1858436E−11 | −2.0721434E−11 |
| A14 | −1.5700008E−15 | −2.8484882E−15 | −7.3662898E−13 | 1.3892855E−13 |
| A15 | −8.1219883E−17 | −7.2513713E−17 | 1.9227467E−13 | −9.5589830E−14 |
| A16 | 2.0351729E−18 | 5.6553464E−18 | −3.9619707E−14 | 2.0599768E−14 |
| A17 | 3.8188631E−19 | 5.3269960E−19 | −1.6950300E−15 | 1.0951853E−15 |
| A18 | −1.1250958E−20 | −2.4152388E−20 | 6.0255568E−16 | −3.1633447E−16 |
| A19 | −3.0246245E−22 | −4.4861106E−22 | −3.2537737E−17 | 1.3778648E−17 |
| A20 | 1.0493545E−23 | 2.2384282E−23 | 4.4063532E−19 | −4.4916662E−20 |

TABLE 3

EXAMPLE 1

| | INFINITY | MIDDLE | CLOSE |
|---|---|---|---|
| f | 16.48 | 16.38 | 15.82 |
| β | 0.000 | 0.031 | 0.209 |
| FNo. | 1.44 | 1.46 | 1.59 |
| 2ω[°] | 81.8 | 81.6 | 80.8 |
| DD[11] | 5.5671 | 5.0428 | 2.3627 |
| DD[23] | 1.0017 | 1.0660 | 1.9168 |
| DD[25] | 13.7445 | 14.2045 | 16.0338 |

Figure 5:
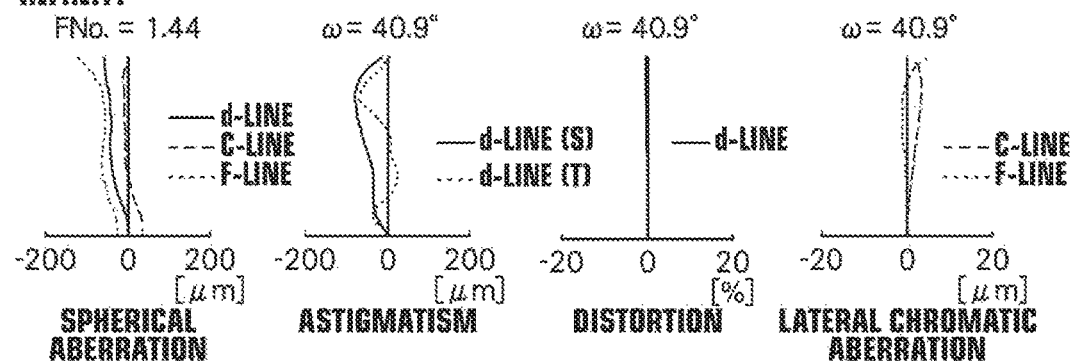
FIG. 5 is aberration diagrams of the imaging lens in Example 1 of the present disclosure illustrating, in order from the left side, a spherical aberration, astigmatism, distortion and a lateral chromatic aberration.
Figure 5:
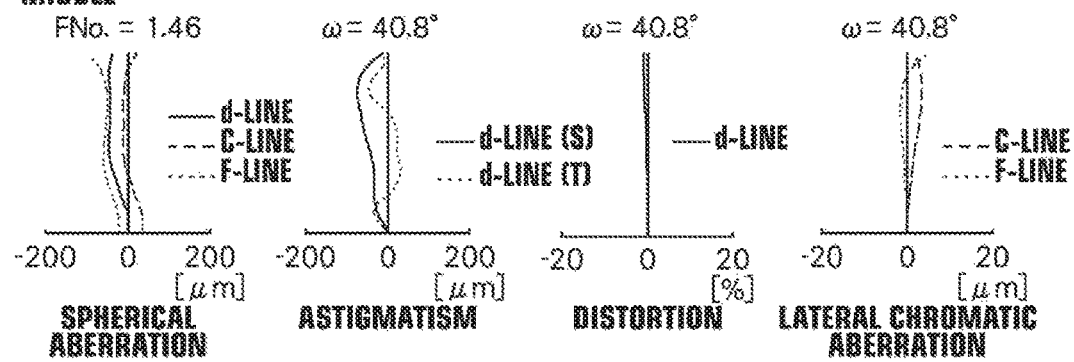
Figure 5:
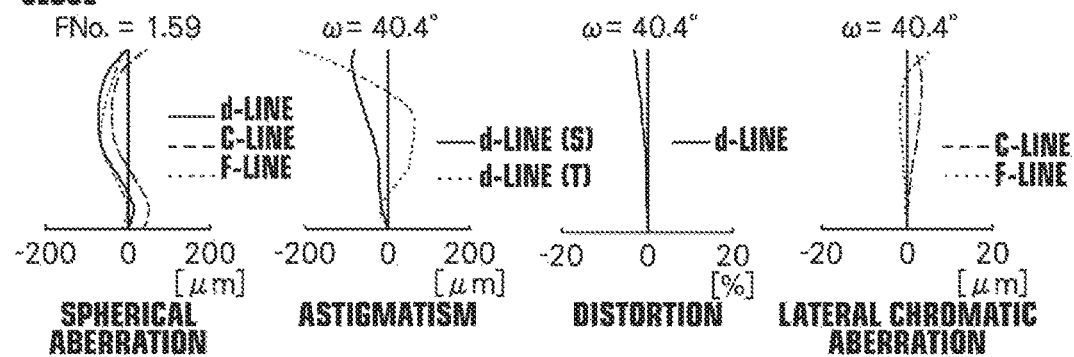

FIG. 5 is aberration diagrams of the imaging lens in Example 1. The top row of FIG. 5 illustrates, in order from the left side, a spherical aberration, astigmatism, distortion, and a lateral chromatic aberration in a state of having focused on an object at infinity. The middle row of FIG. 5 illustrates, in order from the left side, a spherical aberration, astigmatism, distortion, and a lateral chromatic aberration in a state of having focused on an object at middle distance. The bottom row of FIG. 5 illustrates, in order from the left side, a spherical aberration, astigmatism, distortion, and a lateral chromatic aberration in a state of having focused on an object at close distance. Lateral magnification in the state of having focused on an object at middle distance and lateral magnification in the state of having focused on an object at close distance about FIG. 5 are the same as those in the respective states shown in Table 3. In the diagram of a spherical aberration, aberrations for d-line (wavelength is 587.6 nm), C-line (wavelength is 656.3 nm) and F-line (wavelength is 486.1 nm) are indicated by a black solid line, a long broken line and a short broken line, respectively. In the diagram of astigmatism, aberrations for d-line in a sagittal direction and a tangential direction are indicated by a solid line and a short broken line, respectively. In the diagram of distortion, an aberration for d-line is indicated by a solid line. In the diagram of a lateral chromatic aberration, aberrations for C-line and F-line are indicated by a long broken line and a short broken line, respectively. In the diagram of the spherical aberration, FNo. represents an F-number, and in the other aberration diagrams, w represents a half angle of view.

The mark, meaning and description method of each kind of data described about Example 1 are similar also in the following examples, unless otherwise mentioned. Therefore, repetition of explanation will be omitted.

Example 2

Figure 2:
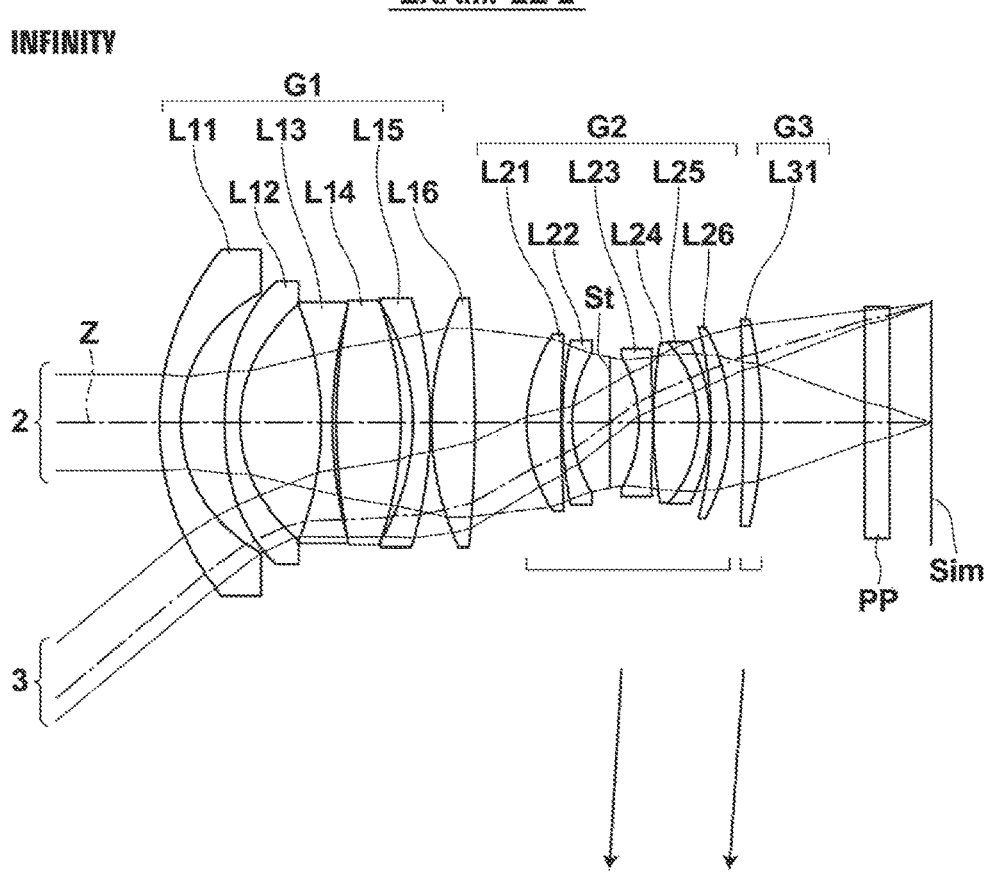
FIG. 2 is a sectional view illustrating the configuration of an imaging lens in Example 2 of the present disclosure and optical paths.
Figure 2:
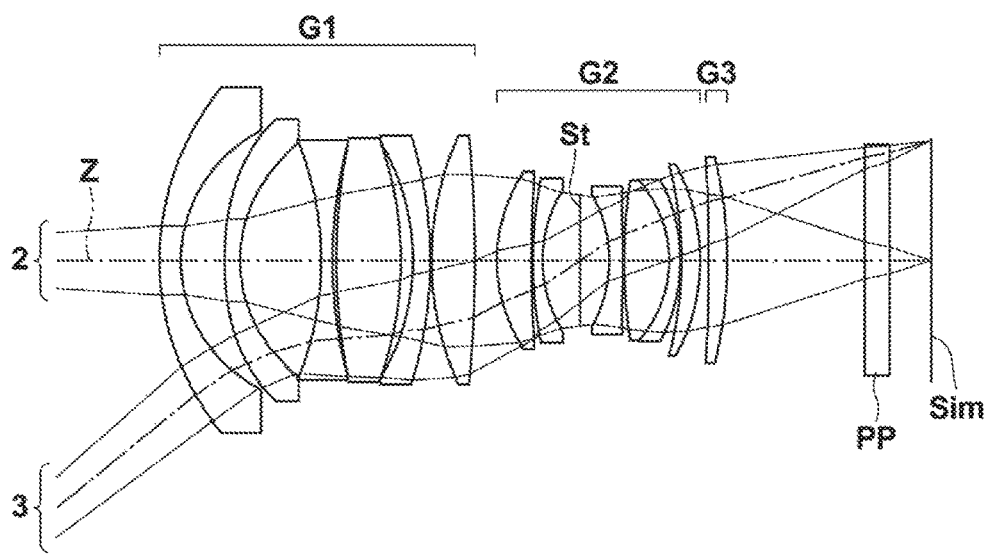
Figure 6:
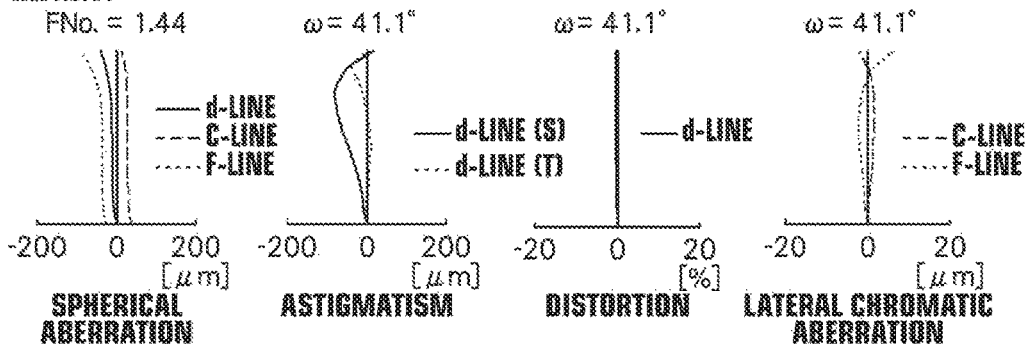
FIG. 6 is aberration diagrams of the imaging lens in Example 2 of the present disclosure illustrating, in order from the left side, a spherical aberration, astigmatism, distortion and a lateral chromatic aberration.
Figure 6:
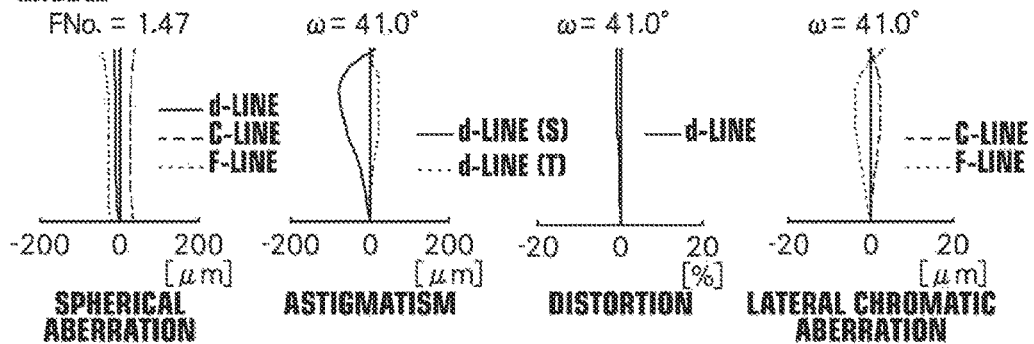
Figure 6:
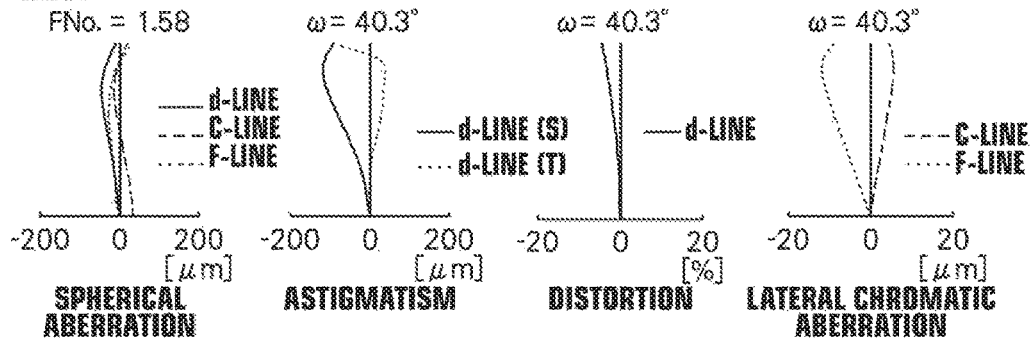

FIG. 2 is a diagram illustrating the configuration of an imaging lens in Example 2. The imaging lens in Example 2 consists of three lens groups of first lens group G1 through third lens group G3. First lens group G1 is fixed, and second lens group G2 and third lens group G3 move in the direction of an optical axis in such a manner that a distance between second lens group G2 and third lens group G3 changes during focusing. The number of lenses included in each of first lens group G1 through third lens group G3 is similar to that of Example 1. Table 4 shows basic lens data of the imaging lens in Example 2. Table 5 shows aspheric coefficients. Table 6 shows specification and the values of variable surface distances. FIG. 6 illustrates aberration diagrams of the imaging lens in Example 2.

TABLE 4

EXAMPLE 2

| Si | Ri | Di | Ndj | vdj |
|---|---|---|---|---|
| 1 | 33.1597 | 2.4333 | 1.80518 | 25.42 |
| 2 | 17.4979 | 5.0163 | | |
| *3 | 41.2286 | 1.8000 | 1.58313 | 59.38 |
| *4 | 18.5501 | 9.2712 | | |
| 5 | −38.7431 | 1.3000 | 1.60300 | 65.44 |
| 6 | 56.1485 | 0.4295 | | |
| 7 | 73.2421 | 7.4680 | 2.00100 | 29.13 |
| 8 | −43.0083 | 1.3890 | | |
| 9 | −28.2782 | 1.9920 | 1.77250 | 49.60 |
| 10 | −50.9966 | 0.1300 | | |
| 11 | 36.6393 | 4.9872 | 1.88300 | 40.76 |
| 12 | −156.2709 | DD[12] | | |
| 13 | 19.5658 | 3.9585 | 1.81600 | 46.62 |
| 14 | 153.9081 | 0.1550 | | |
| 15 | 50.6880 | 1.1157 | 1.95906 | 17.47 |
| 16 | 16.3444 | 4.3298 | | |
| 17(St) | ∞ | 3.3231 | | |
| *18 | −16.2217 | 1.6000 | 1.68893 | 31.08 |
| *19 | −68.9717 | 0.1000 | | |
| 20 | 62.4614 | 5.1599 | 1.59282 | 68.62 |
| 21 | −14.7097 | 1.3000 | 1.51742 | 52.43 |
| 22 | −21.1072 | 0.1300 | | |
| 23 | −44.9529 | 2.1373 | 1.59282 | 68.62 |
| 24 | −24.2268 | DD[24] | | |
| 25 | −235.2125 | 2.1185 | 1.77250 | 49.60 |
| 26 | −54.2680 | DD[26] | | |
| 27 | ∞ | 2.8500 | 1.51680 | 64.20 |
| 28 | ∞ | 4.7670 | | |

TABLE 5

EXAMPLE 2

| SURFACE NUMBER | 3 | 4 | 18 | 19 |
|---|---|---|---|---|
| KA | 4.9367001E+00 | 8.8891387E−01 | 3.2814909E−02 | −4.9716305E+00 |
| A3 | 1.7600984E−05 | −1.4960903E−05 | −4.3044569E−06 | −4.8659790E−06 |
| A4 | 1.2153834E−05 | 3.3694100E−05 | 1.3482063E−05 | 1.1129246E−04 |
| A5 | 1.1346506E−05 | 4.3109039E−06 | −4.9055349E−06 | −6.6031513E−06 |
| A6 | −1.2961465E−06 | 1.5838869E−06 | 6.7727293E−07 | 2.0912998E−06 |
| A7 | −5.2491531E−08 | −1.3390289E−07 | −1.4550044E−07 | −5.7238633E−07 |
| A8 | 1.2890037E−08 | −3.8301951E−09 | −4.9898682E−09 | 4.7721542E−08 |
| A9 | −5.1270877E−10 | 2.9600322E−09 | −4.1091887E−09 | 1.0973671E−09 |
| A10 | 7.2682435E−11 | −1.6644945E−10 | 1.1341131E−09 | 4.8202925E−10 |
| A11 | −1.6921003E−11 | −5.2990770E−12 | 2.8953124E−10 | −1.3659866E−10 |
| A12 | 1.8253279E−12 | −1.1572305E−13 | −4.9292970E−11 | 1.4266441E−11 |
| A13 | −1.3548607E−13 | 9.2926253E−14 | −5.9749304E−12 | −3.5351373E−12 |
| A14 | 7.2486407E−15 | −1.4620957E−15 | 3.0935063E−13 | 2.8150077E−13 |
| A15 | −1.5983597E−16 | −4.3370282E−16 | 1.9718966E−13 | 3.6731264E−14 |
| A16 | 5.8245120E−18 | 1.4405577E−17 | −6.2017390E−15 | −1.3833792E−15 |
| A17 | −2.1004499E−18 | 1.7975874E−18 | −2.5786198E−15 | −7.0329380E−16 |
| A18 | 1.9588723E−19 | −1.7987334E−19 | 1.0036902E−16 | 3.4999802E−17 |
| A19 | −7.3492797E−21 | 6.7003261E−21 | 1.5002724E−17 | 3.2914102E−18 |
| A20 | 1.0160485E−22 | −9.5217456E−23 | −8.4601376E−19 | −2.0694560E−19 |

TABLE 6

EXAMPLE 2

| | INFINITY | MIDDLE | CLOSE |
|---|---|---|---|
| f | 16.48 | 16.40 | 15.89 |
| β | 0.000 | 0.031 | 0.209 |
| FNo. | 1.44 | 1.47 | 1.58 |
| 2ω[°] | 82.2 | 82.0 | 80.6 |
| DD[12] | 5.9172 | 5.3410 | 2.5307 |
| DD[24] | 1.5513 | 1.5966 | 0.9691 |
| DD[26] | 11.8000 | 12.3309 | 15.7687 |

Example 3

Figure 7:
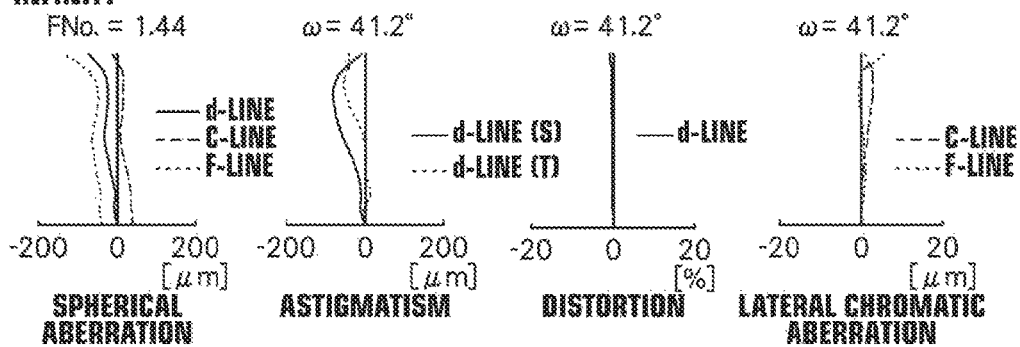
FIG. 7 is aberration diagrams of the imaging lens in Example 3 of the present disclosure illustrating, in order from the left side, a spherical aberration, astigmatism, distortion and a lateral chromatic aberration.
Figure 7:
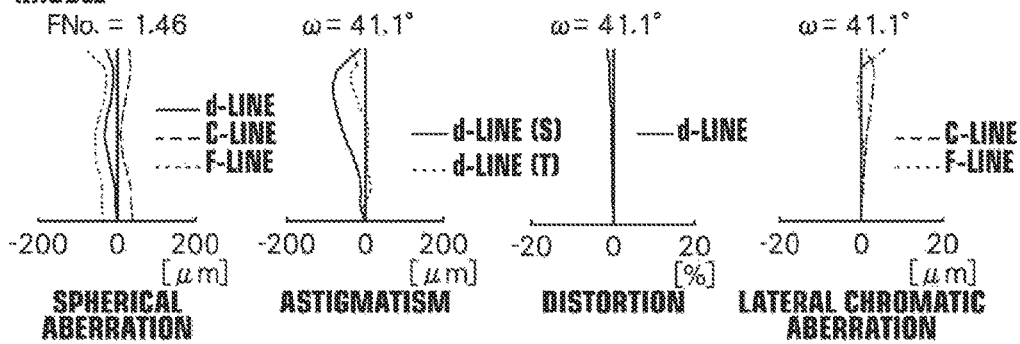
Figure 7:
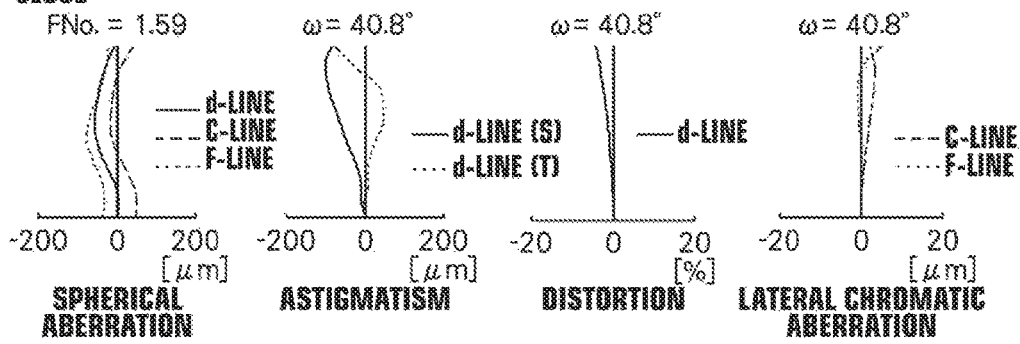

FIG. 3 is a diagram illustrating the configuration of an imaging lens in Example 3. The imaging lens in Example 3 consists of four lens groups of first lens group G1 through fourth lens group G4. First lens group G1 and fourth lens group G4 are fixed, and second lens group G2 and third lens group G3 move in the direction of an optical axis in such a manner that a distance between second lens group G2 and third lens group G3 changes during focusing. Fourth lens group G4 consists of only lens L41. The number of lenses included in each of first lens group G1 through third lens group G3 is similar to that of Example 1. Table 7 shows basic lens data of the imaging lens in Example 3. Table 8 shows aspheric coefficients. Table 9 shows specification and the values of variable surface distances. FIG. 7 illustrates aberration diagrams of the imaging lens in Example 3.

TABLE 7

EXAMPLE 3

| Si | Ri | Di | Ndj | vdj |
|---|---|---|---|---|
| 1 | 35.7060 | 1.8000 | 1.92119 | 23.96 |
| 2 | 18.2532 | 5.0246 | | |
| *3 | 57.8162 | 1.8000 | 1.58313 | 59.46 |
| *4 | 23.5856 | 9.6817 | | |
| 5 | −38.8477 | 1.4000 | 1.48749 | 70.24 |
| 6 | 43.9721 | 0.9985 | | |

TABLE 7-continued

EXAMPLE 3

| Si | Ri | Di | Ndj | vdj |
|---|---|---|---|---|
| 7 | 67.8014 | 5.1548 | 2.00100 | 29.13 |
| 8 | −58.5261 | 1.4100 | 1.51742 | 52.43 |
| 9 | −153.8933 | 0.1300 | | |
| 10 | 29.2976 | 4.5967 | 1.88300 | 40.76 |
| 11 | 222.3909 | DD[11] | | |
| 12 | 23.5355 | 4.0344 | 1.81600 | 46.62 |
| 13 | 149.2031 | 0.2360 | | |
| 14 | 38.5790 | 1.1000 | 1.95906 | 17.47 |
| 15 | 16.4746 | 4.0674 | | |
| 16(St) | ∞ | 3.3737 | | |
| *17 | −13.9726 | 1.7576 | 1.80348 | 40.45 |
| *18 | −14.9863 | 2.2429 | | |
| 19 | −25.1188 | 3.7585 | 1.59282 | 68.62 |
| 20 | −11.3526 | 1.4000 | 1.74077 | 27.79 |
| 21 | −16.9261 | 0.1300 | | |
| 22 | 1099.8720 | 6.5721 | 1.49700 | 81.61 |
| 23 | −17.3475 | DD[23] | | |
| 24 | 108.4360 | 2.0807 | 2.00100 | 29.13 |
| 25 | −388.4758 | DD[25] | | |
| 26 | −166.4170 | 1.3000 | 1.89286 | 20.36 |
| 27 | 66.6777 | 9.0000 | | |
| 28 | ∞ | 2.8500 | 1.51680 | 64.20 |
| 29 | ∞ | 3.0594 | | |

TABLE 8

EXAMPLE 3

| SURFACE NUMBER | 3 | 4 | 17 | 18 |
|---|---|---|---|---|
| KA | −7.9779601E−01 | 8.9150111E−01 | 1.3581104E+00 | 6.3426915E−01 |
| A3 | −6.9846558E−04 | −8.1859783E−04 | 4.3894670E−04 | 3.6347751E−04 |
| A4 | 3.4036180E−04 | 4.4005324E−04 | −5.7402915E−04 | −3.0935766E−04 |
| A5 | −1.3392073E−05 | −4.8704908E−05 | 3.6494293E−04 | 1.8342083E−04 |
| A6 | −5.8868271E−06 | 1.3018176E−06 | −8.2832464E−05 | −2.4359825E−05 |
| A7 | 1.2130161E−06 | 3.0851783E−07 | −3.0924457E−06 | −5.3335990E−06 |
| A8 | −9.3936076E−08 | −2.6157120E−08 | 4.8360213E−06 | 1.4890562E−06 |
| A9 | 1.2480526E−09 | 2.4283132E−10 | −5.7443079E−07 | 1.7669336E−07 |
| A10 | 1.0396989E−10 | −3.6785191E−10 | 8.0609399E−09 | −5.2670895E−08 |
| A11 | 1.4353139E−11 | 5.0871939E−11 | −2.7061500E−08 | −4.6955782E−09 |
| A12 | −1.0046307E−12 | 1.6908288E−12 | 9.4869944E−09 | 7.6244440E−10 |
| A13 | −6.0946865E−14 | −3.9688180E−13 | −8.7093274E−10 | 2.0133476E−10 |
| A14 | 1.8634284E−15 | −1.3058809E−14 | −7.3028269E−11 | −9.7343986E−12 |
| A15 | 2.5842250E−16 | 2.8316972E−15 | 2.4855664E−11 | −4.7419106E−12 |
| A16 | 7.9035821E−18 | −2.9702522E−17 | −2.8611845E−12 | 1.1002410E−13 |
| A17 | −1.3972849E−18 | −3.2494268E−18 | 1.4608615E−13 | 6.4152069E−14 |
| A18 | −2.0929379E−20 | −3.1467823E−19 | 7.7704286E−15 | −6.9568059E−16 |
| A19 | 4.2639808E−21 | 2.9515492E−20 | −1.5322749E−15 | −6.3822337E−16 |
| A20 | −9.1345334E−23 | −5.9737889E−22 | 6.0389158E−17 | 3.2414456E−17 |

TABLE 9

EXAMPLE 3

| | INFINITY | MIDDLE | CLOSE |
|---|---|---|---|
| f | 16.49 | 16.39 | 15.70 |
| β | 0.000 | 0.031 | 0.220 |
| FNo. | 1.44 | 1.46 | 1.59 |
| 2ω[°] | 82.4 | 82.2 | 81.6 |
| DD[11] | 5.8400 | 5.2459 | 2.2774 |
| DD[23] | 1.0000 | 1.7861 | 4.9065 |
| DD[25] | 2.2204 | 2.0284 | 1.8765 |

Example 4

Figure 4:
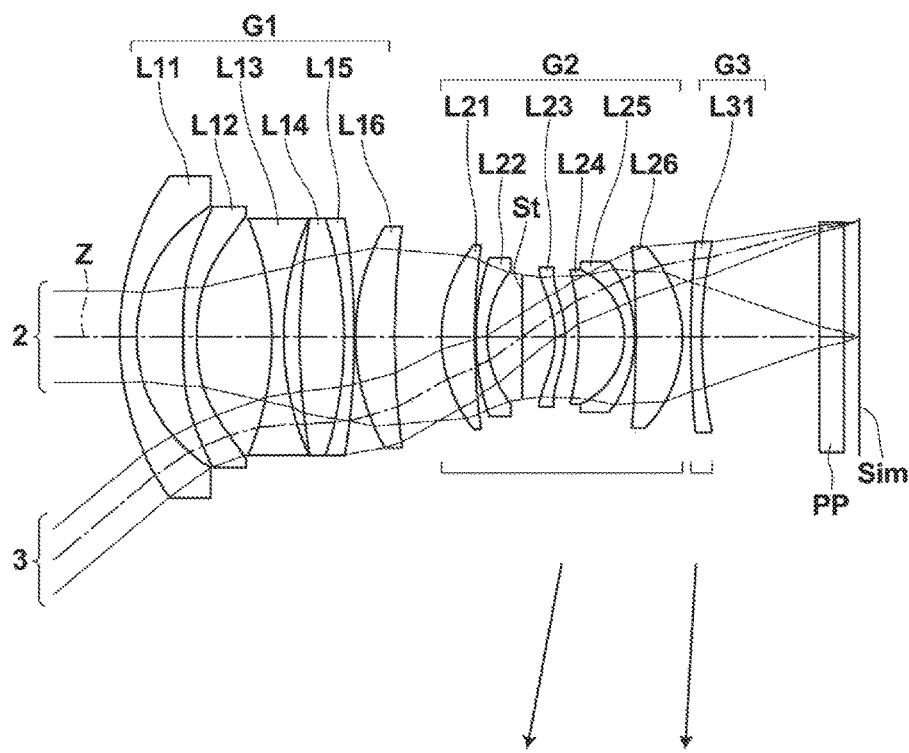
FIG. 4 is a sectional view illustrating the configuration of an imaging lens in Example 4 of the present disclosure and optical paths.
Figure 4:
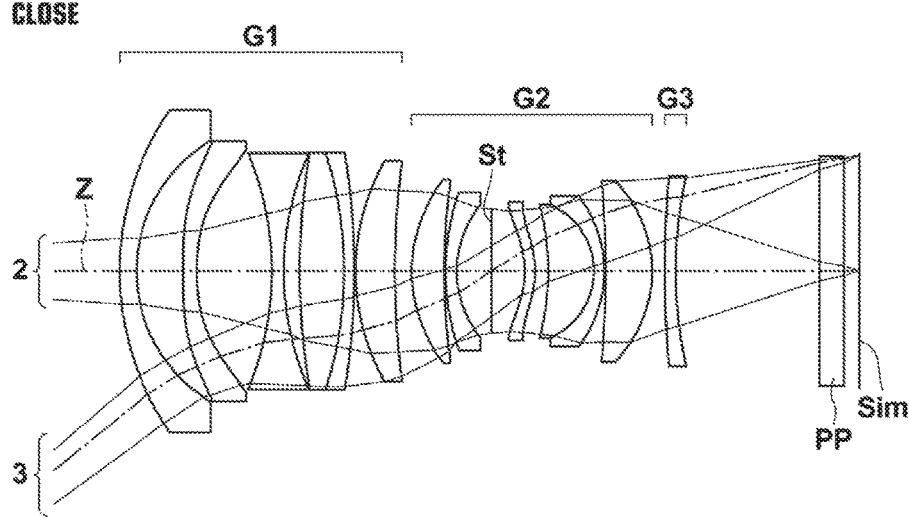
Figure 8:
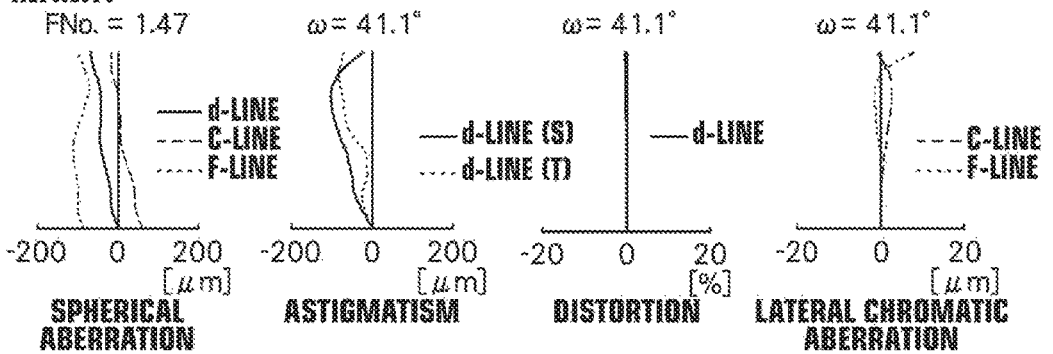
FIG. 8 is aberration diagrams of the imaging lens in Example 4 of the present disclosure illustrating, in order from the left side, a spherical aberration, astigmatism, distortion and a lateral chromatic aberration.
Figure 8:
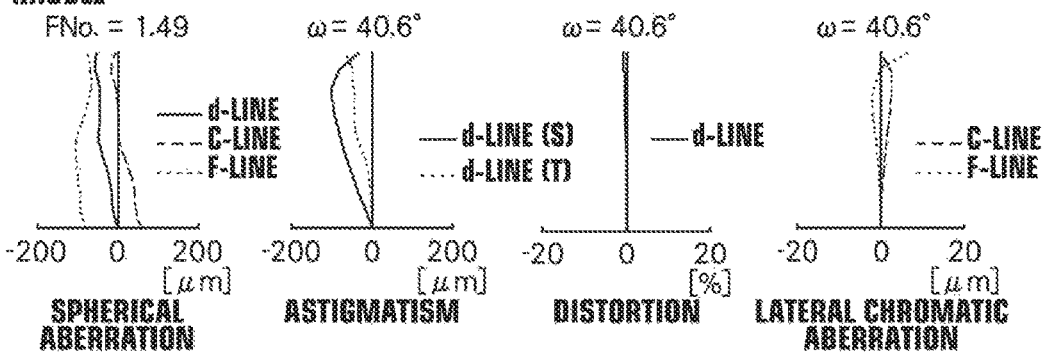
Figure 8:
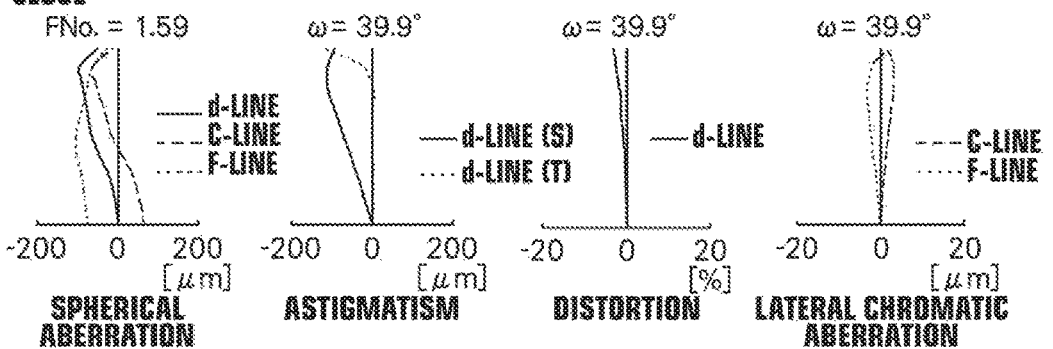

FIG. 4 is a diagram illustrating the configuration of an imaging lens in Example 4. The imaging lens in Example 4 consists of three lens groups of first lens group G1 through third lens group G3. First lens group G1 is fixed, and second lens group G2 and third lens group G3 move in the direction of an optical axis in such a manner that a distance between second lens group G2 and third lens group G3 changes during focusing. The number of lenses included in each of first lens group G1 through third lens group G3 is similar to that of Example 1. Table 10 shows basic lens data of the imaging lens in Example 4. Table 11 shows aspheric coefficients. Table 12 shows specification and the values of variable surface distances. FIG. 8 illustrates aberration diagrams of the imaging lens in Example 4.

TABLE 10

EXAMPLE 4

| Si | Ri | Di | Ndj | vdj |
|---|---|---|---|---|
| 1 | 35.5630 | 2.0000 | 1.84666 | 23.78 |
| 2 | 18.9136 | 5.5606 | | |
| *3 | 636.6799 | 1.6000 | 1.58313 | 59.46 |
| *4 | 33.2533 | 8.8632 | | |
| 5 | −38.3424 | 1.3991 | 1.48749 | 70.24 |
| 6 | 36.8284 | 1.8772 | | |
| 7 | 89.7884 | 5.3080 | 2.00100 | 29.13 |
| 8 | −48.8233 | 1.1870 | 1.58144 | 40.75 |
| 9 | −95.3867 | 0.1471 | | |

TABLE 10-continued

EXAMPLE 4

| Si | Ri | Di | Ndj | vdj |
|---|---|---|---|---|
| 10 | 28.0762 | 4.6541 | 1.90043 | 37.37 |
| 11 | 107.3058 | DD[11] | | |
| 12 | 18.4955 | 3.9203 | 1.83481 | 42.72 |
| 13 | 83.8974 | 0.1437 | | |
| 14 | 30.5444 | 1.3318 | 1.95906 | 17.47 |
| 15 | 13.2618 | 4.1127 | | |
| 16(St) | ∞ | 3.9025 | | |
| *17 | −12.2986 | 1.1990 | 1.80357 | 40.31 |
| *18 | −12.8588 | 1.5878 | | |
| 19 | −32.4338 | 5.4060 | 1.59282 | 68.62 |
| 20 | −9.0368 | 1.1979 | 1.74950 | 35.33 |
| 21 | −15.5948 | 0.1459 | | |
| 22 | −132.9824 | 5.4999 | 1.49700 | 81.61 |
| 23 | −16.2070 | DD[23] | | |
| 24 | 132.1255 | 1.3000 | 1.58144 | 40.75 |

TABLE 10-continued

EXAMPLE 4

| Si | Ri | Di | Ndj | νdj |
|---|---|---|---|---|
| 25 | 55.4049 | DD[25] | | |
| 26 | ∞ | 2.8500 | 1.51680 | 64.20 |
| 27 | ∞ | 1.8264 | | |

TABLE 11

EXAMPLE 4

| SURFACE NUMBER | 3 | 4 | 17 | 18 |
|---|---|---|---|---|
| KA | 0.0000000E+00 | 0.0000000E+00 | 0.0000000E+00 | 0.0000000E+00 |
| A3 | 1.7185324E−04 | −9.2987188E−06 | 1.7644116E−04 | −1.6114309E−05 |
| A4 | 8.5088313E−05 | 2.7497355E−04 | −4.4650933E−04 | 2.1627984E−04 |
| A5 | 2.7584154E−05 | −6.2861180E−05 | 4.7488815E−04 | −1.5229560E−04 |
| A6 | −3.0535569E−06 | 1.8578344E−05 | −2.8001088E−04 | 5.5235436E−05 |
| A7 | −4.6577588E−07 | −2.1403895E−06 | 9.4409150E−05 | 1.5864776E−05 |
| A8 | 7.6790964E−08 | −2.0310628E−07 | −1.2826113E−05 | −1.7259108E−05 |
| A9 | 8.5063897E−10 | 6.6603996E−08 | −2.5461233E−06 | 4.2461759E−06 |
| A10 | −6.9684324E−10 | −2.9795022E−09 | 1.4687057E−06 | 2.2415590E−07 |
| A11 | 2.4155061E−11 | −5.4237572E−10 | −2.2899707E−07 | −2.8316730E−07 |
| A12 | 2.7529595E−12 | 6.0538096E−11 | −1.0780913E−08 | 3.6545621E−08 |
| A13 | −1.8939529E−13 | 5.8451574E−13 | 9.0512702E−09 | 4.2072446E−09 |
| A14 | −3.5875975E−15 | −3.6116882E−13 | −1.0268164E−09 | −1.3627436E−09 |
| A15 | 5.6369879E−16 | 1.1562052E−14 | −5.8888055E−11 | 4.6619849E−11 |
| A16 | −4.9327844E−18 | 8.4292125E−16 | 2.2584803E−11 | 1.6165451E−11 |
| A17 | −7.0093132E−19 | −5.6240946E−17 | −1.3357666E−12 | −1.6383709E−12 |
| A18 | 1.5218109E−20 | −8.2243948E−20 | −9.3391445E−14 | −2.7804914E−14 |
| A19 | 2.3674470E−22 | 7.6037740E−20 | 1.4187129E−14 | 1.0262065E−14 |
| A20 | −6.5030093E−24 | −1.5367675E−21 | −4.7644555E−16 | −3.8279209E−16 |

TABLE 12

EXAMPLE 4

| | INFINITY | MIDDLE | CLOSE |
|---|---|---|---|
| f | 16.49 | 16.44 | 16.03 |
| β | 0.000 | 0.031 | 0.221 |
| FNo. | 1.47 | 1.49 | 1.59 |
| 2ω[°] | 82.2 | 81.2 | 79.8 |
| DD[11] | 5.5739 | 4.9979 | 1.9916 |
| DD[23] | 1.0000 | 0.8357 | 1.4960 |
| DD[25] | 13.9563 | 14.6966 | 17.0426 |

Table 13 shows values corresponding to conditional expressions (1) through (3) for the imaging lenses in Examples 1 through 4. In all of the examples, d-line is a reference wavelength, and Table 13 shows values at this reference wavelength.

TABLE 13

| EXPRESSION NUMBER | | EXAMPLE 1 | EXAMPLE 2 | EXAMPLE 3 | EXAMPLE 4 |
|---|---|---|---|---|---|
| (1) | f1ab/f1 | −0.380 | −0.459 | −0.403 | −0.324 |
| (2) | f2/|f3| | 0.232 | 0.488 | 0.314 | 0.155 |
| (3) | f2/f2a | 0.744 | 1.634 | 0.790 | 0.924 |

As the above data show, in the imaging lenses in Examples 1 through 4, an increase in the diameter of focusing groups is suppressed, and the size of the imaging lens is reduced, and the maximum full angle of view is in the range of about 80° to 85°, i.e., the imaging lens is configured to have a wide angle of view, and the imaging lens has a small F-number of 1.5 or less. Further, the imaging lens has achieved high optical performance in which various aberrations are excellently corrected for object distance from infinity to close distance.

Figure 9A:
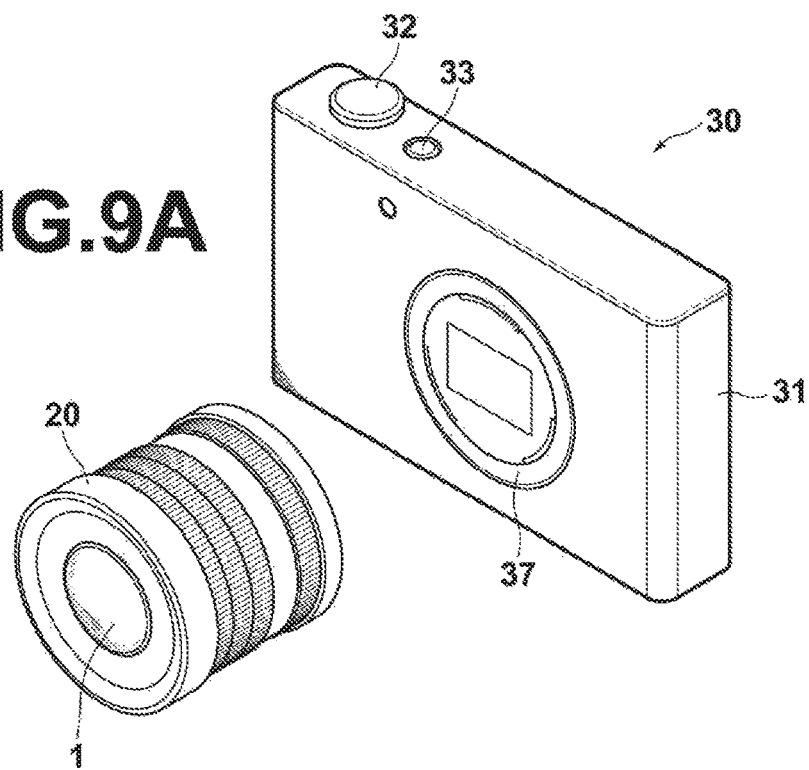
FIG. 9A is a perspective view of the front side of an imaging apparatus according to an embodiment of the present disclosure.
Figure 9B:
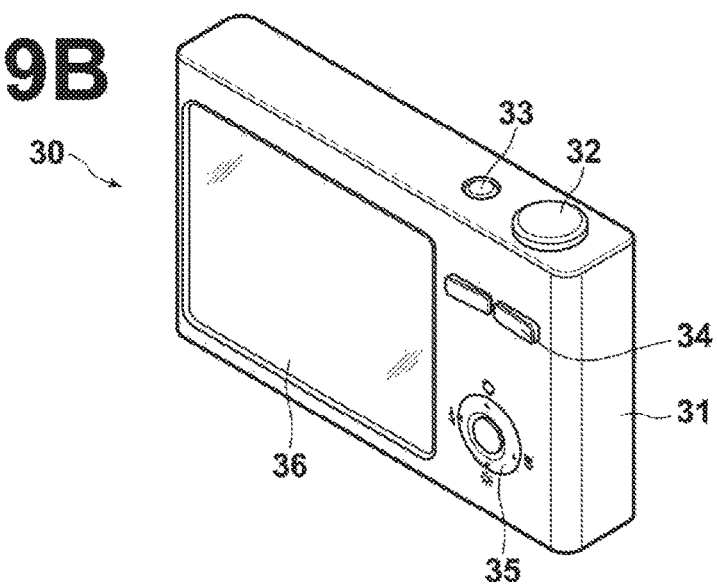
FIG. 9B is a perspective view of the back side of an imaging apparatus according to an embodiment of the present disclosure.

Next, an imaging apparatus according to an embodiment of the present disclosure will be described. FIG. 9A and FIG. 9B are external views of a camera 30, which is an imaging apparatus according to an embodiment of the present disclosure. FIG. 9A is a perspective view in which the camera 30 is viewed from its front side, and FIG. 9B is a perspective view in which the camera 30 is viewed from its back side. The camera 30 is a single-lens-type digital camera without a reflex finder on which an interchangeable lens 20 is detachably mounted. The interchangeable lens 20 is the imaging lens 1 according to an embodiment of the present disclosure housed in a lens barrel.

This camera 30 includes a camera body 31, and a shutter button 32 and a power button 33 are provided on the upper surface of the camera body 31. Further, operation units 34, 35 and a display unit 36 are provided on a back surface of the camera body 31. The display unit 36 is provided to display an image obtained by imaging and an image that is present within an angle of view before imaging.

A photography opening, which light from a subject of photography enters, is provided at a center part on the front surface of the camera body 31. Further, a mount 37 is provided at a position corresponding to the photography opening, and the interchangeable lens 20 is mounted on the camera body 31 through the mount 37.

In the camera body 31, an imaging device (not illustrated), such as a CCD (Charge Coupled Device), which outputs imaging signals corresponding to an image of a subject formed by the interchangeable lens 20, a signal processing circuit that generates an image by processing the image signals output from the imaging device, a recording medium for recording the generated image and the like are provided. In this camera 30, photography of a still image or a moving image is possible by pressing the shutter button 32, and image data obtained by this photography are recorded in the recording medium.

When the imaging lens 1 according to an embodiment of the present disclosure is adopted as the interchangeable lens 20 used in such a camera 30, this camera 30 with the lens mounted thereon is configurable in small size, and has a wide angle of view. Further, the camera 30 can obtain excellent images for object distance from infinity to close distance.

So far, the present disclosure has been described by using embodiments and examples. However, the present disclosure is not limited to the aforementioned embodiments nor examples, and various modifications are possible. For example, the values of a curvature radius, a distance between surfaces, a refractive index, an Abbe number and aspheric coefficients of each lens are not limited to the values shown in the numerical value examples, but may be other values.

Further, in the embodiment of the imaging apparatus, an example of application to a single-lens-type digital camera without a reflex finder was illustrated in drawings, and described. However, the present disclosure is not limited to this use. For example, the present disclosure is applicable to a single-lens reflex type camera, a film camera, a video camera and the like.

What is claimed is:

1. An imaging lens comprising, consecutively in order from the most object-side:

a first lens group having positive refractive power;

a second lens group having positive refractive power and including a positive lens closest to the object side, a stop between an image-side surface of the positive lens closest to the object side in the second lens group and a surface closest to the image side in the second lens group, and toward the image side of the stop in order from the object side, only four lenses of a negative lens, a positive lens, a negative lens and a positive lens; and a third lens group, wherein focusing on an object at close distance from a state of having focused on an object at infinity is performed by moving the second lens group and the third lens group in such a manner that a distance in the direction of an optical axis between the second lens group and the third lens group changes while the first lens group is fixed, wherein the first lens group includes, consecutively in order from the most object-side, a first lens having negative refractive power and a second lens having negative refractive power, and wherein the following conditional expression (1) is satisfied:

$0.1 \leq f2/|f3| < 0.7$  (1), where f2: a focal length of the second lens group, and
f3: a focal length of the third lens group.

2. The imaging lens, as defined in claim 1, wherein the following conditional expression (2) is satisfied:

$-1.5 < f1ab/f1 < -0.1$  (2), where f1ab: a combined focal length of the first lens and the second lens, and
f1: a focal length of the first lens group.

3. The imaging lens, as defined in claim 1, wherein the third lens group consists of only one single lens.

4. The imaging lens, as defined in claim 1, wherein the following conditional expression (3) is satisfied:

$0.3 \leq f2/f2a < 2$  (3), where f2: a focal length of the second lens group, and
f2a: a focal length of the positive lens closest to the object side in the second lens group.

5. The imaging lens, as defined in claim 1, wherein the first lens group includes two positive lenses.

6. The imaging lens, as defined in claim 1, wherein the first lens group includes, toward the image side of the second lens consecutively after the second lens, a third lens having negative refractive power.

7. The imaging lens, as defined in claim 2, wherein the following conditional expression (2-1) is satisfied:

$-1.0 < f1ab/f1 < -0.2$  (2-1).

8. The imaging lens, as defined in claim 7, wherein the following conditional expression (2-2) is satisfied:

$-0.7 < f1ab/f1 < -0.3$  (2-2).

9. The imaging lens, as defined in claim 1, wherein the following conditional expression (1-1) is satisfied:

$0.1 < f2/|f3| < 0.5$  (1-1).

10. The imaging lens, as defined in claim 4, wherein the following conditional expression (3-1) is satisfied:

$0.6 < f2/f2a < 1.7$  (3-1).

11. The imaging lens, as defined in claim 1, the imaging lens consisting of the first lens group, the second lens group and the third lens group.

12. The imaging lens, as defined in claim 1, the imaging lens consisting of the first lens group, the second lens group, the third lens group and a fourth lens group that is arranged toward the image side of the third lens group and fixed during focusing.

13. An imaging apparatus comprising:
the imaging lens, as defined in claim 1.

* * * * *